June 4, 1957 R. P. DIMMER 2,794,972
SELECTIVE SIGNALLING SYSTEM
Filed Nov. 5, 1952
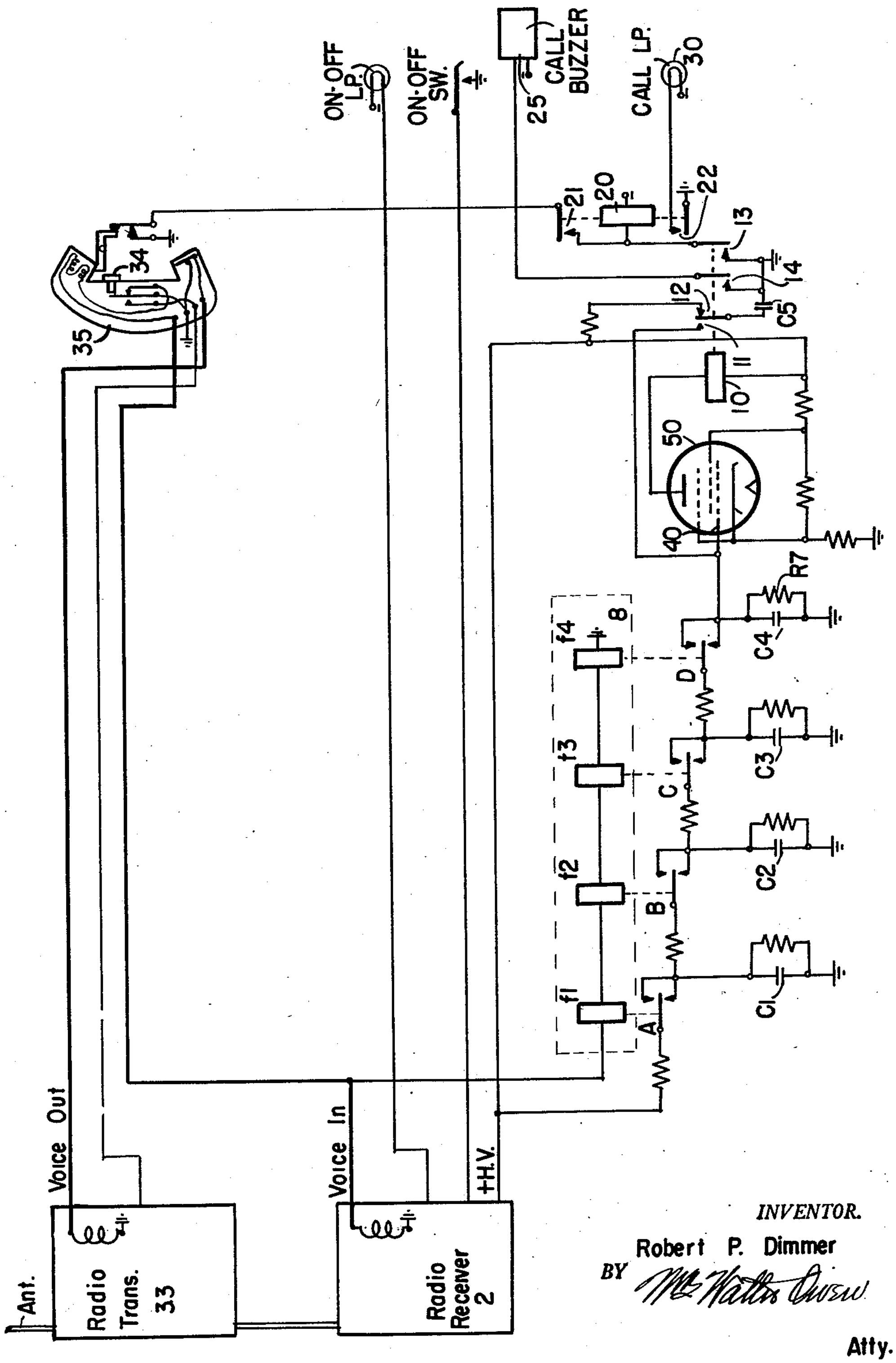
INVENTOR.
Robert P. Dimmer
BY McWatters Owen
Atty.

United States Patent Office 2,794,972

Patented June 4, 1957

2,794,972

SELECTIVE SIGNALLING SYSTEM

Robert P. Dimmer, Lombard, Ill., assignor to General Telephone Laboratories, Incorporated, a corporation of Delaware Application November 5, 1952, Serial No. 318,835

4 Claims. (Cl. 340—213)

The present invention relates to an improved signalling arrangement to be used in a selective signalling system wherein any one of a large number of mobile stations may be called from a master station.

Among the objects of the present invention is to reduce the cost of manufacture of a selective signalling unit; reduce the power drain of such signalling unit; increase the number of available stations that may be signalled; and to provide a reliably operating signal unit.

One feature of the present invention is the novel method of maintaining the signalling circuit energized for a predetermined time.

Another feature is the circuit arrangement for reducing power used.

Another feature of this invention is the arrangement for utilizing an audible and a visual signalling means.

The selecting system disclosed herein employs a group of four tuned relays, each responsive to one of a number of successive audio frequency tones. The master station or central office may transmit a code consisting of any four of a total of eleven different audio frequencies, the tuned relays of only a particular receiving station would be receptive to a certain combination of frequencies and thus a great many combinations are available in this system and a large number of receiving stations would be capable of being signalled. Each of the tuned relays has associated therewith a condenser resistor network of the type disclosed in Patent No. 2,591,937, issued to Herrick, April 8, 1952. In the present system the receiver at the mobile station on receiving a carrier frequency signal from the master station has its audio circuit activated in any well known manner. The carrier wave successively modulated by different audio frequency signals is received at the receiver and the audio frequency signals applied to the tuned relays in the audio circuit. Each relay on operating closes a circuit for charging its associated condenser and on operation of the last relay, a tube or valve is energized for completing a circuit for an audio signal. A condenser circuit arrangement is provided whereby this tube is held energized for a short time interval during which the audio signal is provided and after which time interval a visual signal is provided and the tube deactivated. Thus power drain is reduced to a minimum.

The drawing illustrates one of a group of radio receiving sets each of which embodies the features of this invention. As other receivers in the system are similar to the receiver shown, it is not necessary to repetitiously include other receivers in the drawing. The radio receiver 2 has an audio output circuit 8 which includes tuned relays *f1*, *f2*, *f3* and *f4*, connected in series and has a vacuum tube 50 whose operation is controlled by the contacts of the tuned relays and the resistor condenser networks connected to the contacts. In series with the plate circuit of tube 50 is the control relay 10 which controls the operation of call buzzer 25, relay 20, and condenser C5. Relay 20 controls the operation of call lamp 30.

Radio receiver 2 upon receipt of a particular code operates in response to the receipt of the modulated carrier frequency and transmits tones of different frequencies in accordance with that code over the audio circuit 8 to operate successively the tuned relays *f1*, *f2*, *f3* and *f4* in any well known manner. These tones of different frequencies constitute electrical pulsations for operating the relays which relays in turn cause their respective associated condensers to charge and discharge into the succeeding condenser. The resistors in parallel with the condenser circuits will allow corresponding condensers to discharge after a brief moment so that the unit may restore to normal and permit a second call number to be received. Tube 50 is normally biased to a point close to cut-off in which condition it draws only a few microamperes of plate current.

Tube 50 becomes momentarily fully conductive after relay *f4* operates as condenser C4 on charging momentarily raises grid 40 to a high positive potential. Relay 10 in the anode circuit of tube 50 operates and closes contacts 11, 13 and 14. On contacts 11 closing, normally charged condenser C5 is connected to grid 40 and tube 50 is held conductive for a few moments longer while condenser C5 discharges. This period is approximately four seconds as determined by the time constant of this condenser C5 in parallel with condenser C4 and resistor R7. At contacts 13 a circuit is completed for relay 20, which operates, and at contacts 21 complete its own holding circuit. At contacts 14 a circuit is completed for call buzzer 25 which operates until relay 10 releases on tube 50 becoming deenergized. Therefore there is only a small time interval of large battery drain while the signalling process is proceeding. Contacts 12 on reclosing allow condenser C5 to once again charge. Relay 20 holds operated as described and also closes contacts 22 which complete a circuit for call lamp 30 so that a visual signal is provided until the handset 35 is taken off the hook. The called party at the mobile station on removing handset 35 from its hook breaks the circuit for call lamp 30 and it will extinguish. Now if the called party desires to talk he will flip the button 34 on his handset to activate the transmitter 33, and proceed to answer the call in the usual manner.

This description has been made of the operation of one receiving station on receipt of a carrier modulated by a particular series of tones corresponding to the called station. Other tone combinations are used to signal other stations. These combinations may be varied by the number and arrangement of the different tone responsive relays at the called station. As these mobile stations are generally provided for automobiles, only a limited power supply is available and as often the called party may not be immediately available to manually limit the power drain a method is provided here for operating the tube only for a predetermined time and providing during this time an audible signal so that the subscriber may be notified even if he is not in the immediate vicinity. The visual signal informs the called party that he is being called with a minimum of power drain in the event that the first signal was not heard. It will also be noticed that the subscriber's code need be received only once after which the tube will operate and be held operated for a definite time interval by the charged condenser.

Thus having described my invention in its preferred embodiment but nowise restricting mystelf thereto as many obvious and useful adaptations of this invention may be made what I claim is:

1. A combination comprising a temporarily energized tube, a relay operated on energization of said tube, an audible signal and a visual signal controlled by said operated relay for providing an audible and visual signal, a charged condenser means associated with said tube on operation of said relay for maintaining said tube operated during the discharge period of said condenser means whereby said relay is maintained operated for the discharge period to maintain said audible signal accordingly, and means operated by said operated relay for providing said visual signal after said relay is deenergized to terminate said audible signal.

2. An arrangement for use at a station in a signalling system wherein said station has a tube energized on receipt of electrical pulsations, first means operated by the energization of said tube, other means operated on operation of said first means for providing a signal at said station, means controlled by the operation of said first means for maintaining said tube energized for a predetermined time after termination of said electrical pulsations to thereby maintain said other means operated for said predetermined time after termination of said electrical pulsations, and means for maintaining said other means operated after said predetermined time.

3. In a signalling system having a station, a visual signal and an audible signal at that station, an electronic valve energized on receipt of electrical pulsations, a relay operated by said energized valve for operating said visual signal and said audible signal, a charged condenser connected to said valve on operation of said relay for maintaining said valve energized for a predetermined period of time after termination of said pulsations whereafter said valve is deenergized to render said relay inoperative for terminating said audible signal, and means operated by said operated relay for maintaining the visual signal operated after said relay is rendered inoperative.

4. For use in a signalling system, a tube energized on receipt of a predetermined sequence of electrical current pulsations constituting a signal, a relay operated on energization of said tube for controlling a signal, a charged condenser, and means controlled by the operation of said relay for connecting said charged condenser to said tube for maintaining said tube energized to thereby maintain said relay operated and said signal controlled.

References Cited in the file of this patent

UNITED STATES PATENTS

| | | |
|---|---|---|
| 1,496,875 | Field | June 10, 1924 |
| 2,063,354 | Thorp | Dec. 8, 1936 |
| 2,309,174 | Dodd | Jan. 26, 1943 |
| 2,321,662 | Dodd | June 15, 1943 |
| 2,534,299 | Ruiz et al. | Dec. 19, 1950 |
| 2,591,937 | Herrick | Apr. 8, 1952 |
| 2,607,907 | Marshall | Aug. 19, 1952 |
| 2,617,024 | Hart | Nov. 4, 1952 |
| 2,625,597 | Dodd | Jan. 13, 1953 |

FOREIGN PATENTS

| | | |
|---|---|---|
| 778,571 | France | Mar. 16, 1939 |